April 28, 1964 S. T. BREWER 3,131,361

FREQUENCY-SENSITIVE CONNECTING NETWORK

Filed June 13, 1960

2 Sheets-Sheet 1

INVENTOR
S.T. BREWER
BY
Charles Scott Phelan
ATTORNEY

INVENTOR
S. T. BREWER
BY Charles Scott Phelan
ATTORNEY

United States Patent Office 3,131,361
Patented Apr. 28, 1964

3,131,361
FREQUENCY-SENSITIVE CONNECTING NETWORK
Sherman T. Brewer, Chatham Township, Morris County, N.J., assignor to Bell Telephone Laboratories, Incorporated, New York, N.Y., a corporation of New York
Filed June 13, 1960, Ser. No. 35,597
8 Claims. (Cl. 330—109)

This invention relates to frequency-sensitive connecting networks and more particularly to a four-terminal network including a piezoelectric crystal and means for suppressing an unwanted resonant mode of that crystal.

In certain submarine cable signal transmission systems, a large number of signal repeaters are connected at inaccessible, spaced locations along the cable. Each repeater is provided with an amplifier and a piezoelectric crystal connected in shunt in a negative feedback circuit of the amplifier. The crystal is responsive to a frequency outside of the normal frequency band utilized for transmitting information in the system for producing an irregularity in the voltage-gain-versus-frequency characteristic of the repeater. Since each repeater has a crystal resonant frequency which is peculiar to that repeater, the crystals have come to be called "signature crystals" and their respective resonant frequencies "signature frequencies." The purpose of this ararangement is to monitor the gain of the individual repeaters in the system, and the details of the arrangement and operation of one form of such a signature crystal system are to be found in the U.S. Patent No. 2,580,097 to L. M. Ilgenfritz et al.

It is well known, however, that piezoelectric crystals may have resonant modes at more than one frequency. Some signature crystals have a primary resonant mode which is well above the information frequency band, and they also have an additional, or secondary, resonant mode which falls within the information band. The latter mode in one situation is the face shear mode and is characterized by a crystal resistance at resonance which is much higher than the resistance at resonance in the thickness shear primary mode. Furthermore, it has been found that the gain-versus-frequency characteristic which results from the secondary mode is not sharp; it includes a rather high peak amplitude as well as relatively broad skirt portions of significant amplitude. Such a secondary mode irregularity may be tolerable if one is considering only a single repeater, but when considering a system with plural repeaters and crystals having resonances at different closely-spaced frequencies, it has been found that the skirt portions of the secondary mode gain irregularities overlap and tend to cumulate through the system with the end result that a large irregularity is produced in the system gain in the affected portion of the information frequency band. This irregularity is of such a nature that for practical purposes, it cannot be removed by standard equalization techniques.

Obvious solutions are, of course, to modify the crystal mounting or dimensions or to apply some sort of frequency-sensitive network to the crystal in order to deny access thereto for the secondary mode frequencies. Ordinary suppression systems, such as filters and bridge networks have been tried; but such circuits either require large numbers of components which cannot be conveniently included in compact undersea repeaters, or they produce other undesirable electrical effects in the system. Physical modifidation of the crystal or its mounting has also been found to be inconvenient.

Accordingly, it is a principal object of the invention to suppress the effect of unwanted modes of piezoelectric crystal resonance by means which are both simple and effective.

Another object is to eliminate certain signal repeater gain irregularities with a minimum number of circuit elements and a minimum disturbance to other circuit functions.

An additional object is the modification of the transmission characteristic of a four-terminal frequency-sensitive network in a simple and efficient manner.

The mentioned objects as well as other objects and advantages of the invention are realized in an illustrative embodiment involving a piezoelectric crystal connected in shunt with respect to the negative feedback path of an amplifier by connecting a resistance in parallel with a series coupling capacitor in the feedback path. The resistance of this resistor is made much smaller than the reactance of the coupling capacitor at the resonant frequency of the crystal face shear mode. It has been found that the combination of the impedance of the resistor and the associated coupling capacitor with the crystal impedance reduces to a negligible level the repeater gain irregularity at the face shear resonant frequency. This co-operative combination also significantly reduces the breadth of the skirt portions of the secondary mode gain irregularity.

It is a feature of the invention that the submarine cable system gain irregularity due to secondary crystal resonances is so reduced that it has a relatively minute magnitude and requires no equalization in the ordinary system. The nature of the remnant irregularity is such, however, that it may be readily equalized if so desired.

A better understanding of the novel principles of the invention, together with additional objects and features thereof, may be obtained from the description of an illustrative embodiment in the following specification, including the appended claims, taken together with the attached drawings in which:

Figure 2:
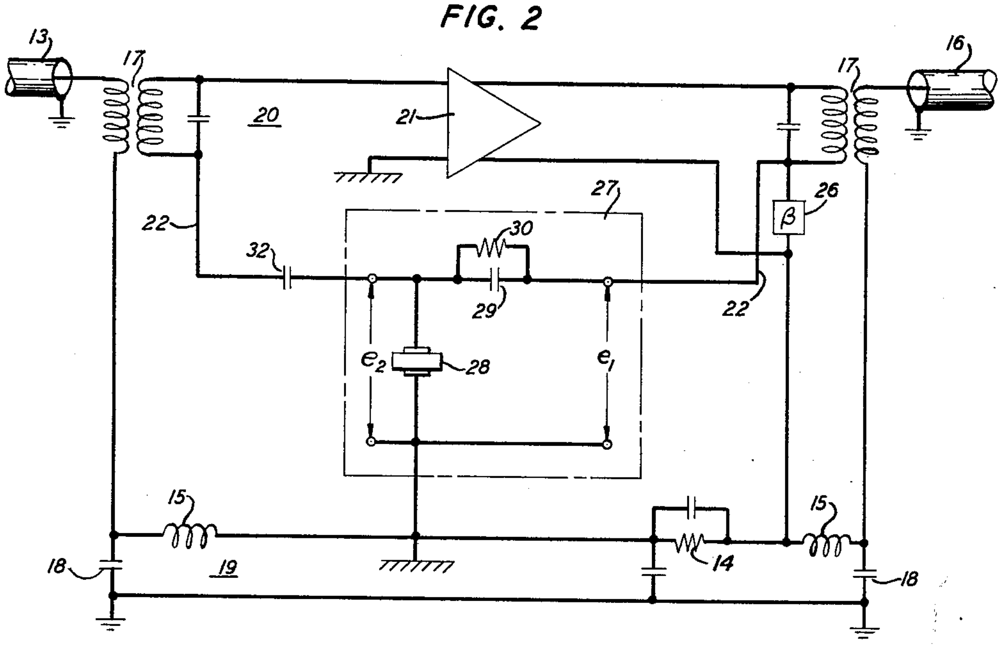
FIG. 2 is a simplified schematic diagram partially in block and line diagram form of a single repeater of the type used in the system illustrated in FIG. 1.
Figure 2A:
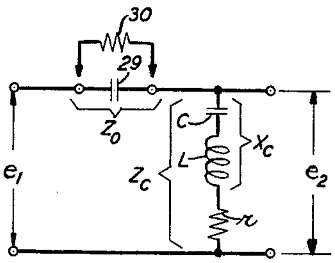

FIG. 2*a* is an equivalent circuit of a portion of FIG. 2; and

Figure 3:
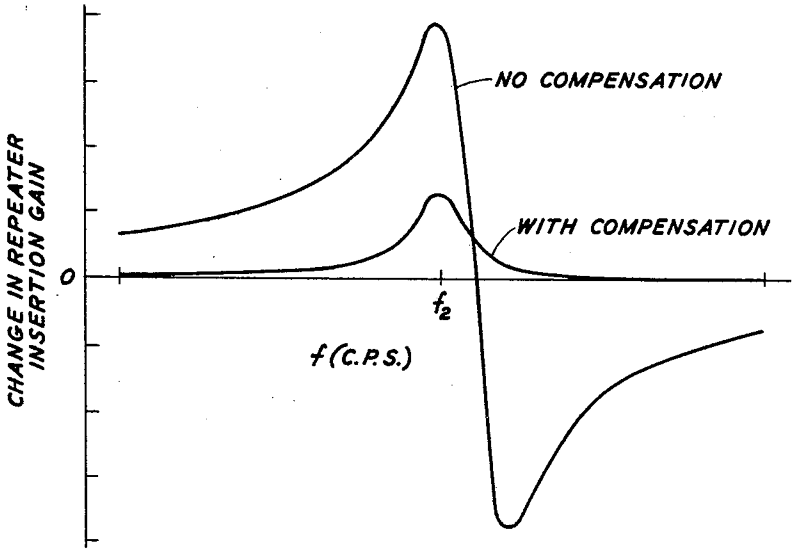
Figure 4:
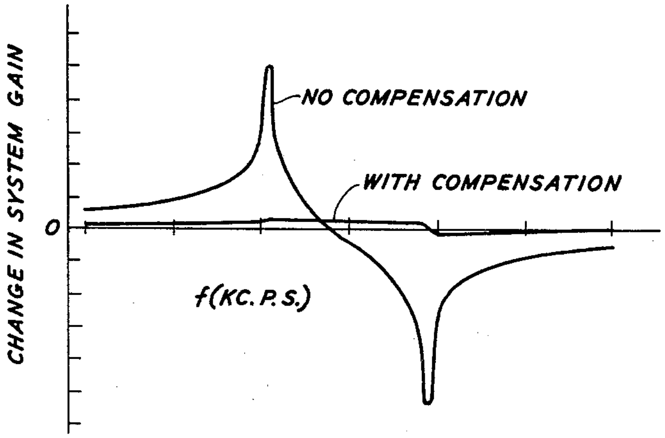

FIGS. 3 and 4 are curves illustrating changes in the insertion gain of a single repeater and of an entire cable system which curves demonstrate technical advantages of the invention.

Figure 1:
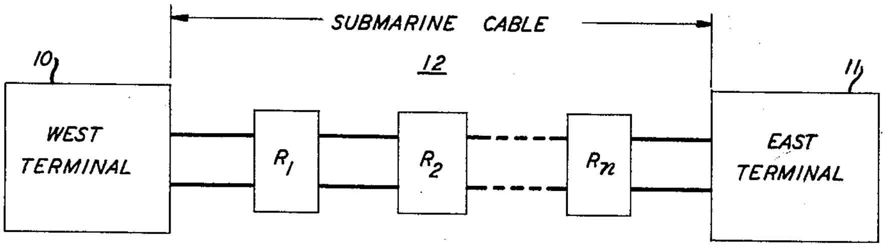
FIG. 1 is a block and line diagram of a typical submarine cable transmission system.

In the cable system of FIG. 1, a west terminal 10 is connected to an east terminal 11 by means of a submarine cable 12 which includes the plural-spaced repeaters $R_1$ through $R_n$. Each repeater includes a signature crystal with a main resonant mode at a frequency which is above the information frequency band of the system and with a secondary resonant mode at a frequency which lies within the information frequency band. As is usual in such systems, the resonant frequencies of the various signature crystals are different from one another; but they are spaced rather closely together in order that the maximum portion of the total bandwidth handled by the cable system may be left open for information signal transmission. Thus, unless some compensation is applied, the aforenoted cumulative secondary resonant effects will appear in the cable system output.

A simplified submarine cable repeater is illustrated in FIG. 2 and is the type of circuit used in the repeaters in FIG. 1. A one-way repeater is shown, but this is not by way of limitation for the circuit could easily be modified for operation as an equivalent four-wire repeater as is well known in the art. The repeater is supplied with both information frequency energy and operating energy from terminals 10 and 11 over the same two conductors in cable sections 13 and 16 which are coupled to the input and output of the repeater. Power separation filters including transformers 17 and high-voltage capacitors 18 separate operating potentials from signal potentials for application to the power channel 19 and to the signal channel 20 in a well-known manner. Inductors 15 are also included in channel 19 to provide additional information frequency suppression therein. A resistor 14 connected in series in channel 19 passes direct current supplied from terminals 10 and 11 and develops a potential difference which comprises the operating potential for the repeater. In practice, the resistance of resistor 14 may comprise the resistances of amplifier tube heaters of the stages of amplifier 21.

A west-to-east amplifier 21 is diagrammatically illustrated in signal channel 20 and includes a negative feedback circuit 22 coupling the output to the input thereof. Operating potential for the final or output stage of amplifier 21 is supplied from channel 19 through a $\beta$ feedback network 26 which is designed to have certain frequency-sensitive characteristics in order that the amplifier gain may be shaped over the information frequency band to compensate for the attenuation of the input cable section 13. Since cables in general use at the present time attenuate high frequencies more than low frequencies, network 26 would be arranged to attenuate high frequencies less than low frequencies. Potentials developed as a result of the presence of $\beta$ network 26 are coupled through feedback circuit 22 to the input of amplifier 21.

Circuit 22 includes a network 27 for further affecting the gain-versus-frequency characteristic of the repeater. Network 27 may be treated as a four-terminal network as will be subsequently described. A piezoelectric crystal 28 is included in network 27 for shunting signals from feedback path 22 to chassis ground for producing a repeater gain irregularity at the primary resonant frequency thereof as is now well known in signature frequency identification systems. A capacitor 29 provides a low impedance coupling to crystal 28 at the signature frequency while at the same time presenting sufficient impedance in combination with $\beta$ network 26 to enable crystal 28 to operate effectively as a feedback shunt at the signature frequency.

In accordance with the invention, a resistor 30 is connected in parallel with coupling capacitor 29 and cooperates therewith and with crystal 28 to suppress effectively the repeater gain effect that would otherwise be produced by the face shear resonance of crystal 28. A blocking capacitor 32 is also added in series in the feedback path to prevent direct operating potentials from reaching the input grid circuit of amplifier 21. The input to amplifier 21 includes in series the signal coupled thereto by transformer 17 and the signal coupled thereto by feedback path 22. Crystal 28 constitutes a shunt impedance to chassis ground across the series combination of capacitor 29, network 26, and bypassed potential-developing resistor 14 in channel 19. Although the lower terminal of crystal 28 is connected to ground only, the network 27 combination of crystal 28 with capacitor 29 and resistor 30 is treated as a four-terminal network with an input potential $e_1$ and an output potential $e_2$.

For effective operation in accordance with the invention, it has been found desirable that the resistance of resistor 30 should be approximately equal to the reactance of capacitor 29 at the main resonant frequency $f_1$ of crystal 28 but should be much smaller than the reactance of capacitor 29 at the secondary resonant frequency $f_2$ of crystal 28. In one circuit arrangement, an advantageous resistance magnitude for resistor 30 was approximately 500 ohms while crystal 28 presented an impedance of approximately 3,000 ohms when resonant in its face shear mode. It can be seen then from these illustrative magnitudes that the bulk of the potential $e_1$ at the input terminals to network 27 is developed across crystal 28 at the face shear resonant frequency. At other adjacent frequencies the impedance of crystal 28 is, of course, higher; and the potential developed across it therefore comprises a still larger portion of the applied voltage. Thus, it would appear that the presence of resistor 30 in the circuit would have limited effect in suppressing any transmission effects of crystal 28. However, an analysis demonstrates the startling effect of this resistor, and for this purpose the equivalent circuit of network 27 is redrawn in FIG. 2*a*. It is not really necessary to consider other parts of the repeater circuit since well-known circuit analysis techniques have demonstrated that the feedback path transmission from amplifier output to amplifier input is essentially the inverse of the amplifier transmission from input to output, or insertion gain.

The FIG. 2*a* resistor 30 is shown disconnected and the initial portion of the analysis assumes that resistor 30 is absent from the circuit in order to demonstrate first the transmission effect of the crystal secondary resonant mode without compensation. The impedance of capacitor 29 is represented as $Z_0$ and the equivalent impedance of crystal 28 at the face shear resonant frequency is represented as impedance $Z_c$ which comprises a resistor *r*, a coil L, and a capacitor *c*. Coil L and capacitor *c* represent the crystal reactance $X_c$.

Considering first the case in which resistor 30 is disconnected, let the tranmission through network 27 in FIG. 2*a* be M. Such transmission will have essentially the same characteristics as the insertion gain of the repeater. It is then apparent that $$M=\frac{e_1}{e_2}=1+\frac{Z_0}{Z_c} \tag{1}$$

$$M=1+\frac{Z_0}{r+jX_c} \tag{2}$$

Since in the case considered $Z_0$ is purely capacitive, we have $Z_0=-jX_0$, and now the tranmission expression becomes $$M=1-j\frac{X_0}{(r+jX_c)} \tag{3}$$

At the face shear resonant frequency $f_2$ it is known that $X_c=0$ and that the transmission is therefore a function of the relative magnitudes of $X_0$ at $f_2$ and of *r* with respect to one another.

Since one of the factors of primary interest is the breadth of the skirts on the gain irregularity it is advantageous to examine the convergence of M toward unity at frequencies sufficiently separated from the resonant frequency $f_2$ so that crystal resistance *r* may be considered negligible with respect to crystal reactance $X_c$. Accordingly, crystal resistance *r* may be omitted from Equation 3 for this purpose. The expression for transmission may be further simplified by adopting the approximation that $X_c \doteq 2\omega_d L$ which may be derived as follows:

Let $\omega$ equal the frequency operator at some frequency different from the resonant frequency $f_2$, and let $\omega_2$ be the frequency operator at the frequency $f_2$ of face shear resonance and at which $X_L=X_c$ $\omega_d$ is the frequency operator for the frequency departure from $f_2$.

Now $$Z_c=r+jX_c=r+j\left(\omega L-\frac{1}{\omega C}\right) \tag{4}$$

Rewriting the reactance portion of Equation 4 in terms of $\omega_2$ and $\omega_d$ for the non-resonant condition we have:

$$X_c=\omega L-\frac{1}{\omega C}=(\omega_d+\omega_2)L-\frac{1}{(\omega_d+\omega_2)C} \tag{5}$$

Expanding the expression $$\frac{1}{\omega_d+\omega_2}$$

which apears in Equation 5 there results the series $$\frac{1}{\omega_2}-\frac{\omega_d}{\omega_2^2}+\frac{\omega_d^2}{\omega_2^3}-\dots \tag{6}$$

For practical purposes it is sufficient to consider only the first two terms of expression (6), and substituting these in Equation 5 we obtain $$X_c=(\omega_d+\omega_2)L-\frac{1}{C}\left(\frac{1}{\omega_2}-\frac{\omega_d}{\omega_2^2}\right) \tag{7}$$

However, since $$\omega_2 L=\frac{1}{\omega_2 C},\ L \text{ is equal to } \frac{1}{\omega_2^2 C}$$

and Equation 7 is reduced at $f_2$ to $$X_c=2\omega_d L \quad (8)$$

Since it was assumed that crystal resistance is negligible at the Off-resonant frequencies under consideration, the value for $X_c$ may be substituted in Equation 3 to produce $$M=1-j\frac{X_0}{j2\omega_d L}=1-\frac{X_0}{2\omega_d L} \quad (9)$$

It is clear from Equation 9 that the transmission converges to unity as a function of the first power of the departure frequency operator $\omega_d$, i.e., inversely as the first power of the frequency deviation from the resonant frequency of the crystal's secondary resonant mode. As previously mentioned, the magnitude of the coupling capacitor reactance $X_0$ is determined by the repeater performance required at the primary resonant mode of the crystal, and this reactance increases at lower frequencies. Thus, the lower the frequency of the secondary crystal mode which is to be suppressed, the larger will be the peak amplitude of the gain irregularity at that frequency. If expression (9) is plotted, a curve similar to the curve in FIG. 3, which is designated "No Compensation," will be obtained. The significant difference between the curve of FIG. 3 and the curve resulting from expression (9) is that the curve resulting from Equation 9 would be discontinuous at the frequency $f_2$ since crystal resistance was neglected. If the computation is carried out including crystal resistance, the No Compensation curve of FIG. 3 results.

There are a number of disadvantages associated with a gain characteristic such as the No Compensation characteristic of FIG. 3. The amplitude of the gain excursion is excessive and may extend in a typical circuit to approximately 4 db both plus and minus. The convergence of the characteristic toward unity is quite slow as $f_d$ increases toward a value corresponding to the average spacing between secondary resonance frequencies of a typical cable system. The latter factor is particularly troublesome in submarine cable systems since the skirt portion of the characteristic of one crystal may overlap similar portions of other crystals thereby producing a very troublesome cumulative effect in a system which may include as many as 100 repeaters in tandem.

Considering now the improved version of FIG. 2*a* in accordance with the invention, resistor 30 is connected in parallel with coupling capacitor 29. It will be recalled that at the crystal secondary resonant frequency $f_2$ the resistance of resistor 30 is much smaller than the reactance of capacitor 29. Neglecting that reactance, the transmission expression for this circuit takes a form which corresponds to Equation 3 for the uncompensated circuit:

$$M=1+\frac{R_{30}}{r+jX_c} \quad (10)$$

Considering again the convergence of the transmission expression toward unity and adopting the same assumptions that were previously adopted for the uncompensated case, i.e., $r$ is much smaller than $X_c$ and $X_c \doteq 2\omega_d L$, the Equation 10 becomes $$M=1-j\frac{R_{30}}{2\omega_d L} \quad (11)$$

The magnitude of Equation 11 is, of course, $$\overline{M}=\sqrt{1+\left(\frac{R_{30}}{2\omega_d L}\right)^2} \quad (12)$$

Since the second term of Equation 12 is much smaller than unity in the region of convergence of M the familiar approximation $\sqrt{1+\Delta}\doteq 1+\frac{1}{2}\Delta$ may be applied and Equation 12 becomes $$\overline{M}\doteq 1+\frac{1}{2}\left(\frac{R_{30}}{2\omega_d L}\right)^2 \quad (13)$$

It is apparent from Equation 13 that the transmission magnitude $\overline{M}$ converges toward unity as a function of the second power of the departure frequency $f_d$ rather than as the first power of $f_d$ as in the uncompensated case. Also, in the region of $f_2$ the maximum value for $Z_0$ is $R_{30}$ regardless of the exact value of $f_2$, the only requirement being that $f_2$ should be sufficiently smaller than $f_1$ so that $R_{30}$ is much smaller than $X_0$. Therefore, the improved circuit does not become progressively more sensitive, from a peak amplitude standpoint, to the secondary resonances as the frequency becomes smaller.

If Equation 13 is plotted, the resultant curve is again discontinuous because crystal resistance was neglected; but, otherwise, such a curve would be similar to the FIG. 3 curve designated "With Compensation." The advantages of the compensation in a single repeater are quite obvious from FIG. 3. The maximum value of the gain irregularity is substantially reduced and, as noted above, has a maximum value corresponding to $Z_0$ with a limiting value depending on the resistance of resistor $R_{30}$. Also, the negative excursion of the insertion gain is eliminated and the convergence as $f_d$ increases is much more rapid than in the uncompensated case.

The system advantage of the compensation in accordance with the invention is demonstrated by the curves of FIG. 4 which show the overall cable system gain irregularity in the frequency band which includes the secondary resonances of all signature crystals both with and without compensation. The cumulative uncompensated irregularity includes large, broad, positive and negative excursions. By contrast, the cumulative effect of the compensated crystal circuits is practically negligible because of the smaller peak amplitudes and the rapid convergence of the individual gain irregularities.

The concept of shunting a series-coupling capacitor in a network to suppress a resonant effect in a shunt branch of the network has been described with reference to a network employing a piezoelectric crystal in the shunt branch. It is to be understood, however, that other applications of the invention, as well as modifications of the basic principle thereof, which will be obvious to those skilled in the art, are included within the scope of the invention.

What is claimed is:

1. A frequency-sensitive coupling network including input terminals, output terminals, a capacitor connected in series between one input terminal and one output terminal and having substantially no other impedance in such series connection, a second input terminal and a second output terminal being connected together, a piezoelectric crystal connected between said output terminals and having a resonant condition at a predetermined frequency, a resistor connected in parallel with said capacitor, and said resistor having a resistance which is much smaller than the resistance of said crystal at said frequency.

2. In a frequency-sensitive network having an input circuit and an output circuit, a piezoelectric crystal connected in shunt across said output circuit and having a main resonant mode and a secondary resonant mode at a frequency which is much lower than the frequency of said main mode, a capacitor connected between said input circuit and said output circuit and having substantially no other impedance in series therewith in such connection, and means to suppress the effect of said secondary mode resonance upon the transfer characteristics of said network, the last-mentioned means comprising a resistor connected in shunt with said capacitor, said resistor having such a small resistance that the reactance due to said capacitor at the frequency of said secondary mode is negligible, the resistance of said resistor also being much smaller than the impedance of said crystal at the frequency of said secondary mode.

3. An electric signal repeater comprising an amplifier having an input circuit and an output circuit, said amplifier being adapted to pass a band of frequencies including a signal frequency band and a signature frequency band, a feedback path connecting said output circuit to said input circuit, a frequency-sensitive network connected in said feedback path and comprising a piezoelectric crystal connected in a shunt branch thereof, said crystal having a primary resonant condition at a first frequency in said signature frequency band of said repeater and having a secondary resonant condition at a second frequency in said signal frequency band, a capacitor connected in series in said feedback path, and a resistor connected in parallel with said capacitor, said resistor having a resistance which is much smaller than the reactance of said capacitor at said second frequency.

4. The electric signal repeater in accordance with claim 3 in which said output circuit includes a frequency-sensitive impedance for establishing the gain level of said amplifier throughout the range of frequencies passed by said amplifier, said impedance having a lower impedance at frequencies in said signature band than at frequencies in said signal band, and said capacitor having a reactance at said first frequency of such magnitude that the total impedance of said capacitor and said frequency-sensitive impedance at said first frequency is much greater than the resistance of said crystal at said first frequency.

5. An electric signal transmission system comprising two system terminals interconnected by a transmission medium which includes a plurality of signal repeaters spaced along said medium and physically inaccessible from said terminals, each of said repeaters comprising an amplifier having a negative feedback path coupled between its output and input circuits, a capacitor connected in series in said feedback path, a signature crystal connected in a shunt branch of said feedback path, said shunt branch being located between said capacitor and the input of said amplifier, said crystal producing a first amplifier gain irregularity at a first frequency outside the signal frequency band of said system and producing a second amplifier gain irregularity at a second frequency inside the signal frequency band of said system, said second irregularity having at least one peak amplitude portion in a narrow band including said second frequency, said second irregularity also having associated with such peak smaller amplitude skirt portions at frequencies outside said narrow band, the narrow band frequencies of each of said irregularities for each of the signature crystals in said system being different for each of said repeaters, said skirt portions of each said second irregularities exhibiting a tendency to include, however, frequencies which are also in the skirt portions of an irregularity of at least one other of said crystals whereby the gain effects thereof are cumulative throughout said system, and means substantially suppressing said tendency, the last-mentioned means comprising a resistor connected in parallel with said capacitor and having a resistance which is much smaller than the reactance of said capacitor at said secondary frequency.

6. An electric signal repeater having an input circuit and an output circuit, an amplifier coupled between said circuits, means supplying operating potential to said output circuit, the last-mentioned means including a frequency-sensitive impedance network for shaping the repeater response configuration throughout the signal frequency band of said repeater, said network having a much lower impedance at the upper frequencies of said band than at the lower frequencies thereof, a feedback path for coupling signals from said output circuit to said input circuit and connected to at least one terminal of said impedance network, said feedback path including a frequency-sensitive coupling circuit and a direct current blocking capacitor connected in series between said output circuit and said input circuit, and said coupling circuit comprising input connections and output connections, a piezoelectric crystal connected in shunt across said output connections and having a first resonant condition at a frequency which is outside the signal frequency band of said amplifier and having a secondary resonant condition at a frequency within said signal band, a capacitor connected in series between said output connections and a portion of said input connections which is also connected to said impedance network, the last-mentioned capacitor having a reactance at said first frequency which, together with the impedance of said impedance network, comprises a total impedance which is substantially greater than the resistance of said crystal at said first frequency, and a resistor connected in parallel with said last-mentioned capacitor and having a resistance which is much smaller than the reactance of said last-mentioned capacitor at said second frequency.

7. An electric signal repeater having an input circuit and an output circuit, a feedback path interconnecting said input and output circuits, a resonant device connected in shunt in said path for substantially reducing the effectiveness of said path at a first frequency, said device also having a secondary resonant condition at a second frequency, a reactive element connected in series in said path, and a resistor connected in parallel with said reactive element, the resistance of said resistor being much smaller than the reactance of said element at said second frequency.

8. A frequency-sensitive network having predetermined transfer characteristics over a certain band of frequencies, said network comprising a capacitor connected in a series branch of said network with substantially no other impedance in series therewith, resonant means connected in a shunt branch of said network and having at least a first resonant condition at a predetermined frequency above said band and a second resonant condition at a frequency within said band, means suppressing the effect of said second resonant condition upon the transmission of said network comprising a resistor, nonreactive means connecting said resistor in parallel with said capacitor, and said resistor having a resistance which is much smaller than the reactance of said capacitor at the frequency of said second resonant condition.

References Cited in the file of this patent

UNITED STATES PATENTS

| | | |
|---|---|---|
| 2,663,190 | Ilgenfritz | Dec. 22, 1953 |
| 2,805,400 | Seddon | Sept. 3, 1957 |
| 2,813,927 | Johnson | Nov. 19, 1957 |
| 2,951,128 | Kingsbury | Aug. 30, 1960 |